May 7, 1940.  F. S. OREM  2,200,010
BACKFIRE SAFETY DEVICE
Filed Oct. 29, 1935
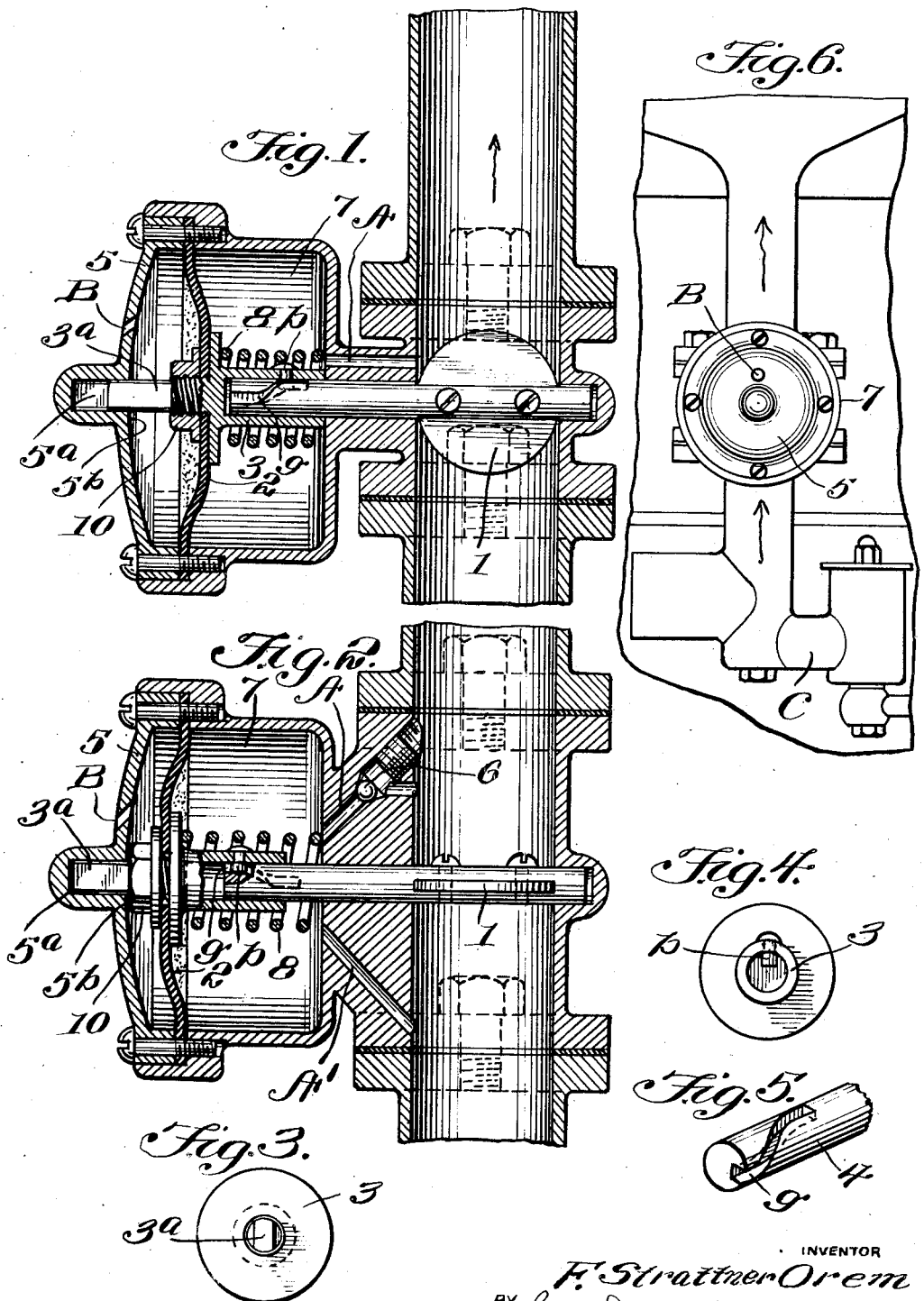
INVENTOR
F. Strattner Orem
BY Spear, Donaldson & Hall
ATTORNEYS Patented May 7, 1940

2,200,010

UNITED STATES PATENT OFFICE 2,200,010

BACKFIRE SAFETY DEVICE

Frederick Strattner Orem, Baltimore, Md.

Application October 29, 1935, Serial No. 47,316

7 Claims. (Cl. 137—153)

The invention is a device for preventing backfire of an internal combustion engine from reaching the carburetor of the engine.

An object of the invention is the provision of a device simple in construction and positive in action which will function automatically and in any position, this being particularly important when used on an airplane.

A further object of the invention is to prevent the flame from leaving the place where it originates, the volume of mixture between the fire and a butterfly valve trapping the fire and confining it to the place where it starts, namely, at the inlet valve to the motor.

The invention is illustrated in the accompanying drawing in which

Figure 1 is a sectional view of the device disposed in the passage between the carburetor and the engine.

Fig. 2 is a view of a modified form of the invention.

Figs. 3 and 4 are detail views of the nut member 3.

Fig. 5 is a detail of the rotary shaft or bolt member provided with a groove therein.

Fig. 6 is a reduced diagrammatic elevation of the device.

Referring to the drawing, 1 represents a butterfly or disc valve disposed to open and close the passage between the carburetor C and the engine. Suction of the engine in the direction of the arrow affects a diaphragm 2, which is also subject on its opposite side to atmospheric pressure, by which diaphragm the disc or butterfly valve 1 is operated. The butterfly valve 1 is thus controlled in opening by the reduced pressure produced by the suction of the engine, reducing pressure on the inside of the diaphragm 2 so that it is held inwardly with the valve 1 open, by the atmospheric pressure acting upon the outer or other side of the diaphragm.

A non-rotating nut member 3 is connected to the diaphragm 2 and receives and engages a rotary bolt member 4 by means of a threaded or screw connection which may be a pin $p$ on one of the members operating in a spiral groove $g$ on the other. The groove may be square in cross section. The rotary bolt member 4 carries the butterfly or valve disc 1. The non-rotating nut 3 is movable longitudinally with the diaphragm, and is of a length to engage the inner wall of chamber 7 when the diaphragm is moved inwardly. Movement of the diaphragm and nut outwardly is suitably limited as by engagement of nut 10 with a stop portion 5b of the head 5, to determine the closed position of the valve 1.

The thread is of such pitch that when the nut or sleeve 3 is seated against the inner wall of chamber 7, the valve disc 1 will be in full open position, and when the diaphragm is in normal position with the nut retracted, the valve 1 will be closed. A spring 8 urges the diaphragm to normal position.

The chamber 7 houses the diaphragm and nut 10 and a port A communicates the diaphragm chamber 7 with the engine intake passage. The nut member 3 has an extension 3a passing through the diaphragm and guided in a squared recess 5a in the head 5 of the chamber 7. The extension 3a is of square section to fit the recess 5a so that the nut is thereby guided and prevented from rotating.

A clamping nut 10 threaded to the base of the extension 3a may be employed to clamp the nut 3 to the diaphragm 2. The head 5 of the diaphragm housing is provided with a port B to the atmosphere.

As shown, the entire valve and diaphragm device may be constructed as a unit and inserted in the intake pipe and bolted thereto.

When the engine is turned over in starting, suction, or lessened pressure from the engine through port A is produced in the chamber 7 on the inside of the diaphragm, and the diaphragm is moved inwardly, carrying the non-rotating nut 3 inwardly which causes rotation of the bolt or shaft 4 by means of the thread connection between the nut and bolt. The valve 1 is thereby moved to open position communicating the carburetor with the engine, and remains open so long as the normal operation of the engine produces suction or lessened pressure, enabling the diaphragm to be disposed inwardly.

When the suction of the motor which produces the lessened pressure ceases for any reason, due to the motor backfiring or stopping, the ceasing of the suction or lessened pressure enables the spring 8 to move the diaphragm outwardly which moves the valve 1 to close the same, to cut off communication between the carburetor and engine preventing escape of backfire or gases to the carburetor or atmosphere. When the suction of the motor is resumed, the diaphragm will move inwardly and the valve will open communication between the carburetor and engine.

Fig. 2 shows a modification of my invention in which two ports A and A' between the diaphragm chamber and the intake pipe are provided, one on either side of the butterfly valve 1. The port A is provided with a ball valve 6. The ball valve closes by gravity and/or by back pressure. When the motor is started, suction through port A after lifting or unseating the ball valve 6 reduces pressure in the chamber 7, and the diaphragm moves inward to open the valve 1, as hereinbefore described. When the motor stops, or a backfire occurs, the suction ceases and the ball valve 6 closes by gravity and back pressure, cutting off communication to chamber 7. Port A' below the valve, however, is open, and pressure in the intake pipe after suction ceases is transmitted through the port A' to the chamber 7. Atmospheric pressure can enter from the carburetor through the port A'. With pressure from the intake pipe transmitted to chamber 7 through port A', the spring 3 is free to act to move the diaphragm outwardly to close the butterfly valve 1, to prevent escape of gases to the atmosphere and to prevent fire from reaching the carburetor.

One main idea of the ball valve 6 is to protect the diaphragm against damage from violent back pressure when backfiring takes place. Therefore, the ball valve is made to close as soon as suction ceases (or back pressure exists), so as to prevent the entrance of pressure into the diaphragm chamber from a point above the butterfly valve. Atmospheric pressure is free to go through port A' from a point below the butterfly valve the instant the suction ceases, thus causing a prompt operation of the diaphragm and a prompt closing of the butterfly valve. The butterfly valve is moved toward closing by the action of atmospheric pressure entering the diaphragm chamber through port A' so that the force of the back pressure, which might damage the diaphragm, is cut off before it can reach port A'.

The main purpose of the upper port A is to allow the suction of the engine to reduce pressure in the diaphragm chamber to cause opening of the butterfly valve.

Where the thread or screw connection between the diaphragm and rotary shaft is herein referred to, it will be understood to refer either to an ordinary threaded relation between the parts, or to a pin and spiral groove connection as herein mentioned.

I claim:

1. In combination, a rotary valve in the intake pipe of an internal combustion engine, a rotary shaft carrying said valve, a chamber in communication with said intake pipe, and a diaphragm disposed in said chamber and subject to variation in pressure therein, a non-rotary projection from said diaphragm, and a connection between said projection and said rotary shaft whereby movement of said diaphragm rotates said valve, said chamber being in communication with said intake pipe by means of a port on the engine side of said rotary valve and by means of a port on the opposite side of said valve, and a ball valve closing said first mentioned port and opened under suction in the intake pipe.

2. In combination with the intake pipe of an internal combustion engine, a valve disposed in said intake pipe between the carburetor and the engine, and pressure responsive means connected to said valve for operating the same, said pressure responsive means being subject on one side to atmospheric pressure and being subject on the other side to the pressure within said intake pipe, to maintain said valve open during suction produced by the engine and to close said valve when the suction ceases, said pressure responsive means comprising a diaphragm, a housing for said diaphragm mounted external to said engine intake pipe, a port extending through the wall between the housing and the intake pipe on the engine side of said valve, a port between the housing and the intake pipe on the opposite side of said valve, a ball valve closing said first mentioned port and opened under suction in the intake pipe, and a port to atmosphere in the wall of said housing on the opposite side of said diaphragm.

3. In apparatus of the class described for preventing a backfire from reaching a source of fuel supply, comprising a conduit, a housing mounted on the wall of the conduit, a disk valve rotatably mounted on a transverse rotary shaft in said conduit, said rotary shaft extending into said housing, a diaphragm mounted in said housing, a non-rotary sleeve fixed to and movable with said diaphragm, a thread connection between said sleeve and shaft to rotate the valve upon movement of the diaphragm, stop means limiting the said movement of the sleeve and diaphragm, a spring surrounding and urging said sleeve and diaphragm outwardly, a port between the housing and the conduit, and a port to atmosphere from said housing at the opposite side of said diaphragm, whereby said spring acts together with increase of pressure on the inside of said diaphragm to positively and immediately close the valve upon cessation of suction such as occurs upon backfire, said sleeve having an extension passing through said diaphragm, said extension being non-circular in cross section and guided in a non-circular recess in said housing to restrain the sleeve against turning.

4. In apparatus of the class described for preventing a backfire from reaching a source of fuel supply, comprising a conduit, a housing mounted on the wall of the conduit, a disk valve rotatably mounted on a transverse rotary shaft in said conduit, said rotary shaft extending into said housing, a diaphragm mounted in said housing, a non-rotary sleeve fixed to and movable with said diaphragm, a thread connection between said sleeve and shaft to rotate the valve upon movement of the diaphragm, stop means limiting the said movement of the sleeve and diaphragm, a spring surrounding and urging said sleeve and diaphragm outwardly, a port between the housing and the conduit, and a port to atmosphere from said housing at the opposite side of said diaphragm, whereby said spring acts together with increase of pressure on the inside of said diaphragm to positively and immediately close the valve upon cessation of suction such as occurs upon backfire, said sleeve having an extension passing through said diaphragm, said extension being non-circular in cross-section and guided in a non-circular bore in said housing to restrain the sleeve against turning, a clamping nut screw threaded to the base of said extension to clamp the sleeve to the diaphragm.

5. In apparatus of the class described for preventing a backfire from reaching a source of fuel supply, comprising a conduit, a housing mounted on the wall of the conduit, a disk valve rotatably mounted on a transverse rotary shaft in said conduit, said rotary shaft extending into said housing, a diaphragm mounted in said housing, a non-rotary sleeve fixed to and movable with said diaphragm, a thread connection between said sleeve and shaft to rotate the valve upon movement of the diaphragm, stop means limiting the said movement of the sleeve and diaphragm, a spring surrounding and urging said sleeve and diaphragm outwardly, a port between the housing and the conduit, and a port to atmosphere from said housing at the opposite side of said diaphragm, whereby said spring acts together with increase of pressure on the inside of said diaphragm to positively and immediately close the valve upon cessation of suction such as occurs upon backfire, said sleeve having an extension passing through said diaphragm, said extension being non-circular in cross-section and guided in a non-circular bore in said housing to restrain the sleeve against turning, a clamping nut screw threaded to the base of said extension to clamp the sleeve to the diaphragm, a stop portion of the wall of said housing to be engaged by said clamping nut to limit the outward movement of the diaphragm, the inward movement of the diaphragm being limited by engagement of the inner end of the sleeve with the wall between the housing and conduit.

6. In combination, a rotary valve in a conduit, subject to suction, a rotary shaft carrying said valve, a chamber in communication with said conduit, and a diaphragm disposed in said chamber and subject to variation in pressure therein, a non-rotary projection from said diaphragm, and a connection between said projection and said rotary shaft whereby movement of said diaphragm rotates said valve, said chamber being in communication with said conduit by means of a port on the suction side of said rotary valve, and by means of a port on the opposite side of said valve, and a ball valve closing said first mentioned port and opened under suction in the conduit.

7. In combination with a conduit subject to suction, a valve disposed in the conduit, and pressure responsive means connected to said valve for operating the same, said pressure responsive means being subject on one side to atmospheric pressure and being subject on the other side to the pressure within said conduit, to maintain said valve open during maintenance of suction and to close said valve when the suction ceases, said pressure responsive means comprising a diaphragm, a housing for said diaphragm mounted external to said conduit, a port extending through the wall between the housing and the conduit on the suction side of said valve, a port between the housing and the conduit on the opposite side of the valve, a ball valve closing said first mentioned port, and a port to atmosphere in the wall of said housing on the opposite side of said diaphragm.

F. STRATTNER OREM.